(12) United States Patent
Becker et al.

(10) Patent No.: US 7,133,424 B2
(45) Date of Patent: Nov. 7, 2006

(54) METHOD AND DEVICE FOR SYNCHRONIZING A MOBILE RADIO RECEIVER WITH A TIME SLOT STRUCTURE OF A RECEIVED RADIO SIGNAL

(75) Inventors: Burkhard Becker, Ismaning (DE); Markus Dötsch, Schliern (CH); Peter Jung, Otterberg (DE); Tideya Kella, München (DE); Jörg Plechinger, München (DE); Peter Schmidt, Ellerstadt (DE); Michael Schneider, München (DE)

(73) Assignee: Infineon Technologies AG, Munich (DE)

( * ) Notice: Subject to any disclaimer, the term of this patent is extended or adjusted under 35 U.S.C. 154(b) by 1037 days.

(21) Appl. No.: 10/177,309

(22) Filed: Jun. 20, 2002

(65) Prior Publication Data

US 2002/0196772 A1 Dec. 26, 2002

Related U.S. Application Data

(63) Continuation of application No. PCT/DE00/04522, filed on Dec. 18, 2000.

(30) Foreign Application Priority Data

Dec. 20, 1999 (DE) .................... 199 61 557

(51) Int. Cl.
*H04J 3/06* (2006.01)
(52) U.S. Cl. ............... 370/514; 375/354; 375/343; 375/149
(58) Field of Classification Search ........... 370/514, 370/509; 375/354, 343, 149, 142, 145, 147, 375/150

See application file for complete search history.

(56) References Cited

U.S. PATENT DOCUMENTS

| 4,847,877 | A | | 7/1989 | Besseyre |
| 5,373,507 | A | | 12/1994 | Sköld |
| 5,526,297 | A | | 6/1996 | Snyder, Jr. et al. |
| 5,883,929 | A | | 3/1999 | Wang et al. |
| 6,377,615 | B1 | * | 4/2002 | Sourour et al. ............. 375/150 |
| 6,421,371 | B1 | * | 7/2002 | Sourour et al. ............. 375/142 |
| 6,522,684 | B1 | * | 2/2003 | Okubo et al. ............... 375/147 |
| 7,010,071 | B1 | * | 3/2006 | Michel et al. ............... 375/354 |

FOREIGN PATENT DOCUMENTS

| DE | 198 18 514 A1 | 11/1999 |
| EP | 0 789 467 A2 | 8/1997 |
| EP | 0 804 002 A1 | 10/1997 |

OTHER PUBLICATIONS

Jung, P: "Analyse und Entwurf digitaler Mobilfunksysteme" (Analysis And Design Of Digital Mobile Radio Systems), B.G. Teubner, 1997, pp. 236-237.

* cited by examiner

*Primary Examiner*—Hassan Kizou
*Assistant Examiner*—Albert T. Chou
(74) *Attorney, Agent, or Firm*—Laurence A. Greenberg; Werner H. Stemer; Ralph E. Locher

(57) ABSTRACT

In a method for synchronizing a mobile radio receiver with a radio signal time slot structure a first portion, detected during a first time slot period, and a second portion, detected during a later time slot period, of a received time slot synchronization code sequence is correlated with the known time slot synchronization code sequence sent out by the base station in the receiver. From the two obtained correlation results, the position of the time slots in time is determined.

7 Claims, 4 Drawing Sheets

METHOD AND DEVICE FOR SYNCHRONIZING A MOBILE RADIO RECEIVER WITH A TIME SLOT STRUCTURE OF A RECEIVED RADIO SIGNAL

CROSS-REFERENCE TO RELATED APPLICATION

This application is a continuation of copending International Application No. PCT/DE00/04522, filed Dec. 18, 2000, which designated the United States and was not published in English.

BACKGROUND OF THE INVENTION

FIELD OF THE INVENTION

The invention relates to a method for synchronizing a mobile radio receiver with a time slot structure of a radio signal received from a base station, and a time slot synchronizing device for a mobile radio receiver.

The operation of a mobile radio system requires time synchronization between the base station and the mobile station. A distinction is made between two forms of synchronism: frequency synchronism and time slot synchronism. The invention exclusively relates to time slot synchronism. Time slot synchronization occurs on the downlink, i.e. from the base station (transmitter) to the mobile station (receiver). Time slot synchronism means that the mobile station detects (i.e. acquires in the correct time) a time division, used in the base station, of the transmitted data stream in the received radio signal, which provides both for time slot-related processing of the received user data and for the generation of the radio signals to be transmitted in the mobile station at the correct time (i.e. synchronized with the base station).

From the book "Analyse und Entwurf digitaler Mobilfunksysteme" (Analysis and design of digital mobile-radio systems) by P. Jung, Stuttgart, B. G. Teubner, 1997, pages 236–237, it is already known to perform the time slot synchronization of the mobile stations by means of so-called "synchronization bursts" that are sent out at regular intervals by the base stations.

It has been proposed in CDMA (Code Division Multiple Access) systems, to use a synchronization channel for achieving the time slot synchronism. The base station sends out exactly one time slot synchronization code sequence per time slot into the synchronization channel in continuous repetition. The time slot period and the time slot synchronization code sequence sent out by the base station are known to the mobile station. The mobile station detects the position in time of the time slot structure used by the base station by correlating the data elements of the time slot synchronization code sequence sent out, which are detected (reconstructed) over one time slot period from any desired starting point, with all cyclic displacements of this time slot synchronization code sequence. During this process, the mobile station determines the (possibly cyclically displaced) time slot synchronization code sequence with the maximum correlation. The cyclic displacement of the sequence of maximum correlation found provides for the time slot synchronization in the mobile station.

The time slot synchronization described takes place within the period of one time slot. The disadvantageous factor in this method is, however, the large memory requirement. With a number of 5632 samples per time slot period with a word width of 8 bits per inphase or quadrature branch, respectively, 5632×8×2 bits must be temporarily stored for each time slot. The memory size of more than 5 k×16 bits needed for this represents a significant cost factor in mobile radio applications.

SUMMARY OF THE INVENTION

It is accordingly an object of the invention to provide a method for time slot synchronization of a mobile station with a base station which overcomes the above-mentioned disadvantages of the prior art methods of this general type.

In particular, it is an object of the invention to provide a method for time slot synchronization of a mobile station with a base station, which has a low memory space requirement. It is an additional object of the invention to provide a device for time slot synchronization of a mobile station with a base station, in which the device has a low memory space requirement.

Due to the fact that in each case only portions of the detected time slot synchronization code sequence (and not the entire time slot synchronization code sequence detected) are used for calculating the correlation, only this portion needs to be stored in a memory for each correlation calculation. This reduces the demand for storage space and at the same time it increases the "measuring time" that is needed for determining the position of the received time slots in time, to a number of (at least two) time slot periods.

It generally holds true that the shorter the detected portions of the received time slot synchronization code sequence, which form the basis of the individual correlation calculations, are (with constant number of sampled portions per time slot period), the smaller the storage space requirement but the larger the measuring time.

A preferred measure of the inventive method is characterized by the fact that in each case a number of detected portions of the time slot synchronization code sequence are correlated with the time slot synchronization code sequence that is known in the receiver within the first and the later time slot period.

From the point of view of storage space economy, it is also appropriate in this case that the several portions of the detected time slot synchronization code sequence with respect to one time slot period are in each case stored in the same data memory by overwriting the memory content. This presupposes that the correlation calculation on the basis of a portion of the detected time slot synchronization code sequence has already been concluded at the time of overwriting of the memory content with the next portion of the detected time slot synchronization code sequence.

In the section-by-section sampling and correlation calculation method, let the entire time slot synchronization code sequence detected be taken into consideration after a recursion period of K time slot periods. An advantageous variant of the method is characterized by the fact that an integration of the correlation results obtained over a number of recursion periods is performed with respect to equal portions. Using the integration result in the determination of the position of the time slots in time makes it possible to increase further the accuracy of the above determination—at the expense of the measuring time—without increasing the memory space requirement.

A further advantageous variant of the method is characterized in that the correlation result data are compressed and that the time slot position in time is determined by using the compressed correlation result data. During the data compression, the volume of data needed for representing a single correlation result (calculated from the correlation of a single portion of the detected time slot synchronization code sequence with the known time slot synchronization code sequence) is greatly reduced.

In the inventive device, it is also only detected portions of the received time slot synchronization code sequence and not the entire detected time slot synchronization code sequence that are correlated with the time slot synchronization code sequence known in the receiver, using the method described above. This makes it possible to reduce the memory space of the data memory to such an extent that it can only store the data volume of a single portion of the detected time slot synchronization code sequence.

With the foregoing and other objects in view there is provided, in accordance with the invention, a method for synchronizing a mobile radio receiver with a time slot structure of a radio signal obtained from a base station. The method includes a step of: in each of a plurality of time slots, using the base station to send out a time slot synchronization code sequence that is known in the mobile radio receiver. The time slot synchronization code sequence includes a predetermined sequence of data elements. The method also includes steps of, in the mobile radio receiver: during a first time slot period, detecting at least a first portion of the time slot synchronization code sequence; obtaining a first result by correlating the first portion of the time slot synchronization code sequence that is detected with a known time slot synchronization code sequence; during a later time slot period, detecting at least a second portion of the time slot synchronization code sequence; obtaining a second result by correlating the second portion of the time slot synchronization code sequence that is detected with the known time slot synchronization code sequence; and determining a time slot position in time from the first result and the second result.

In accordance with an added feature of the invention, during the first time slot period and during the second time slot period, a plurality of portions of the time slot synchronization code sequence are detected and the plurality of the portions of the time slot synchronization code sequence are correlated with the known time slot synchronization code sequence.

In accordance with an additional feature of the invention, the method includes: overwriting the memory content of a given data memory to store the plurality of the portions of the time slot synchronization code sequence of the second time slot period.

In accordance with another feature of the invention, the method includes: defining the time slot synchronization code sequence as a first time slot synchronization code sequence; and after each one of a plurality of recursion periods of K time slot periods:

detecting a first portion of a second time slot synchronization code sequence that is sent out by the base station, the second time slot synchronization code sequence being identical to the first time slot synchronization code sequence, obtaining a first additional result by correlating the first portion of the second time slot synchronization code sequence with the known time slot synchronization code sequence, detecting a second portion of the second time slot synchronization code sequence, and obtaining a second additional result by correlating the second portion of the second time slot synchronization code sequence with the known time slot synchronization code sequence;

obtaining a first integration result by integrating each first additional result obtained over the plurality of the recursion periods;

obtaining a second integration result by integrating each second additional result obtained over the plurality of the recursion periods; and using the first integration result and the second integration result to perform the step of determining the time slot position in time.

In accordance with a further feature of the invention, the method includes: compressing the first result and the second result to obtain a compressed first result and a compressed second result; and performing the step of determining the time slot position in time by using the compressed first result and the compressed second result.

Other features which are considered as characteristic for the invention are set forth in the appended claims.

Although the invention is illustrated and described herein as embodied in a method and device for synchronizing a mobile radio receiver with a time slot structure of a received radio signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
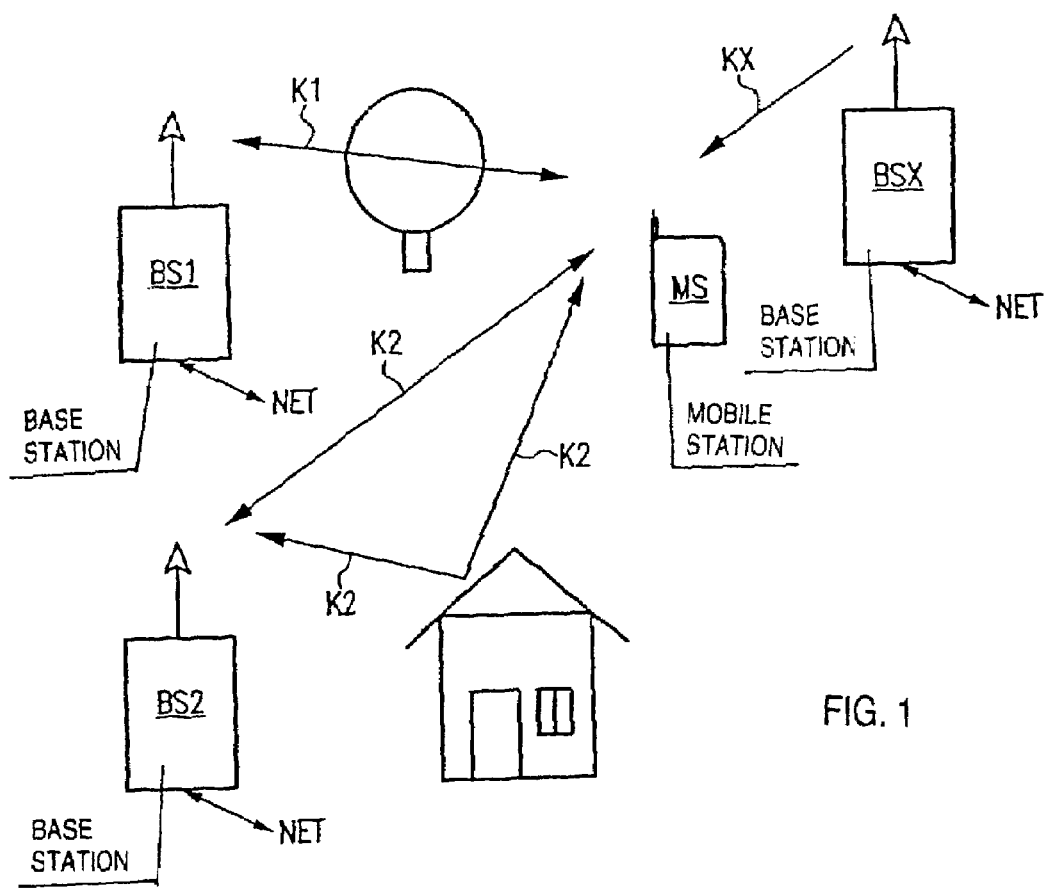
FIG. 1 shows a diagrammatic representation of the air interface of a mobile radio system with a mobile station and a number of base stations.

FIG. 1 shows a diagrammatic representation of the air interface of a cellular mobile radio system. A mobile station MS allocated to a single subscriber is located within the radio area of a number of base stations BS1, BS2, . . . , BSX, which are connected to a common telecommunication network. The communication links K1, K2, . . . , KX, . . . between the base stations BS1, BS2, . . . , BSX, . . . and the mobile station MS are subject to multipath propagation.

Each base station BS1, BS2, . . . , BSX, . . . is in radio communication with a multiplicity of other mobile stations (not shown). The radio signals F of all base stations, which are sent via the communication links K1, K2, . . . , KX, . . . exhibit a frame structure which is uniform throughout the system, i.e. structurally identical.

Figure 2:
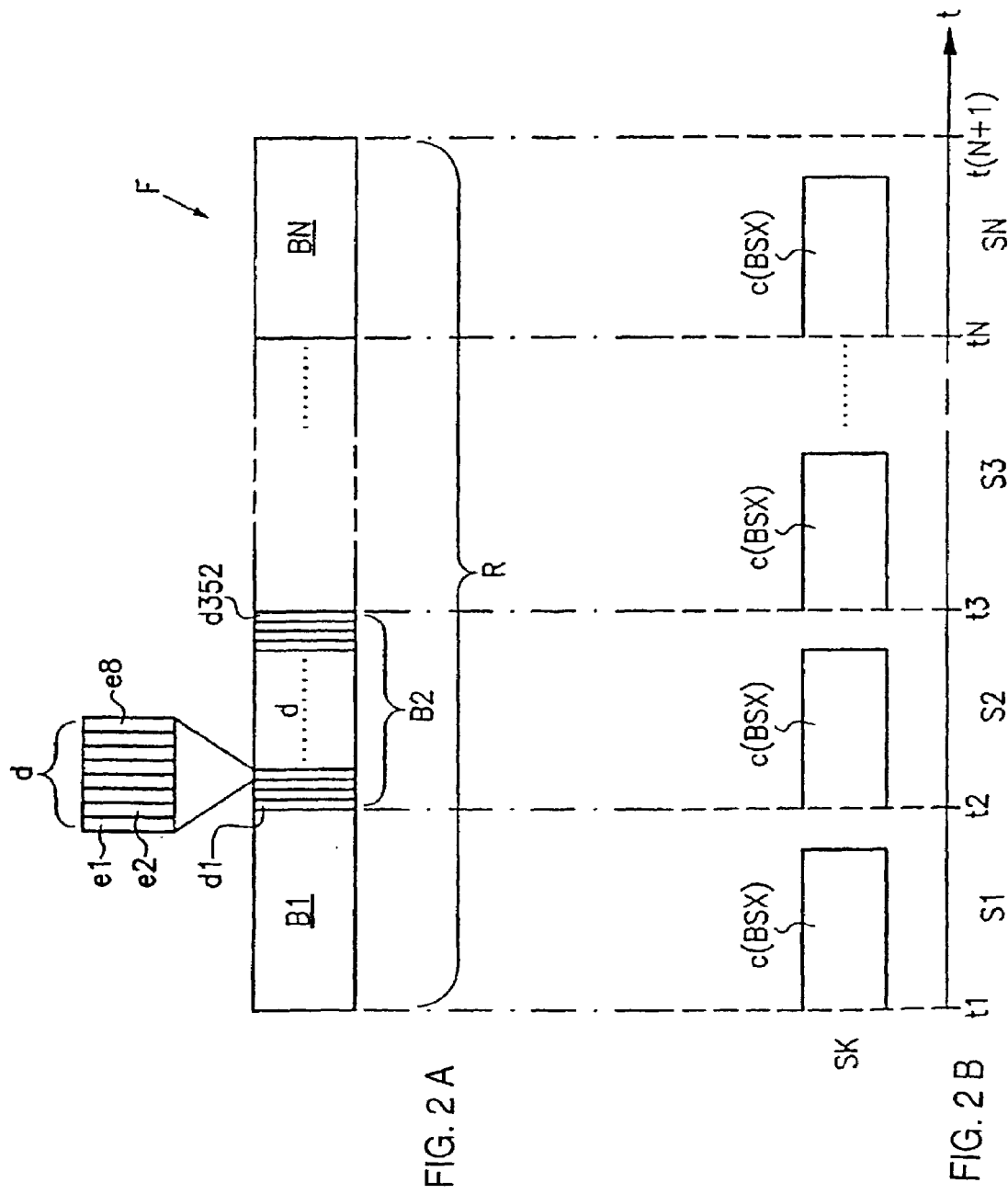
FIG. 2a shows a diagrammatic representation of the data structure of a frame used in the mobile radio system, which extends over a period of N time slots.
FIG. 2b shows a diagrammatic representation of a synchronization channel in which the emission of a time slot synchronization code sequence at the location of a base station is plotted against time t.

FIG. 2a shows an example of such a frame structure of a radio signal F.

The radio signal (user signal) F consists of a sequence of individual data symbols (bits) d. A data block B1; B2; . . . ; BN is formed from a system-standard-related number of data symbols d (for example 352 data symbols in this case). Each data block E1; E2; . . . ; BN is sent out within one time slot (i.e. the division of the data into data blocks corresponds to the division of the time into time slots). A frame R is built up out of a system-standard-related number N of data blocks B1, B2, . . . , BN. For example, a frame R can be built up out of N=16 data blocks B1, B2, . . . , B16 and then includes 5632 data symbols d in the present example.

The example shown in FIG. 2a is based on a CDMA radio signal F. This means that each data symbol d is spread-spectrum coded with a subscriber-related spread-spectrum code (CDMA code). The spread-spectrum code includes, for example, 8 chips e1, e2, . . . , e8 per data symbol d.

The entire frame/block/data symbol/chip structure of a radio signal F, shown in FIG. 2a, and the corresponding frame/time slot/data symbol/chip periods are predetermined by the system and are identical for the transmitted radio signals F of all base stations BSI, i=1, 2, If, in conjunction with the setting-up or handover of a call, it is intended to set up a bidirectional communication link KX between the mobile station MS and a particular base station BSX (usually for the one which has the greatest received signal strength at the mobile station MS), the mobile station MS must first be synchronized with the time slot structure of the radio signal F received from the particular base station BSX, i.e. the mobile station MS must be capable of recognizing the start and the end of a received data block B1, B2, . . . , BN.

To achieve the time slot synchronism, a synchronization channel SK which is common to all base stations BSI is used (see FIG. 2b).

Each base station BSI sends out a synchronization code sequence c(BSI) at the beginning of each base station-related time slot in the synchronization channel SK. The synchronization code sequences sent out by the base station BSX are shown in FIG. 2b and are designated by c(BSX). The first time slot S1 extends from t1 to t2, the second time slot S2 extends from t2 to t3, . . . , and the Nth time slot SN extends from tN to t(N+1).

In the example explained here, let it be assumed that the time slot synchronization code sequence c(BSX) includes 2560 data elements (chips).

In the text which follows, a special exemplary embodiment of the method according to the invention is explained in greater detail with reference to FIG. 3.

During the detection of a time slot synchronization code sequence c(BSX) in the receiver MS, a signal received in the synchronization channel SK is sampled with two-times oversampling (i.e. 5632 samples per time slot period) and for each I branch and Q branch, respectively, a sampled data signal of a word width of 8 bits is generated.

Taking into consideration the two receiving branches, a memory of more than 5 k×16 bits would be required for storing the entire time slot synchronization code sequence c(BSX).

Figure 3:
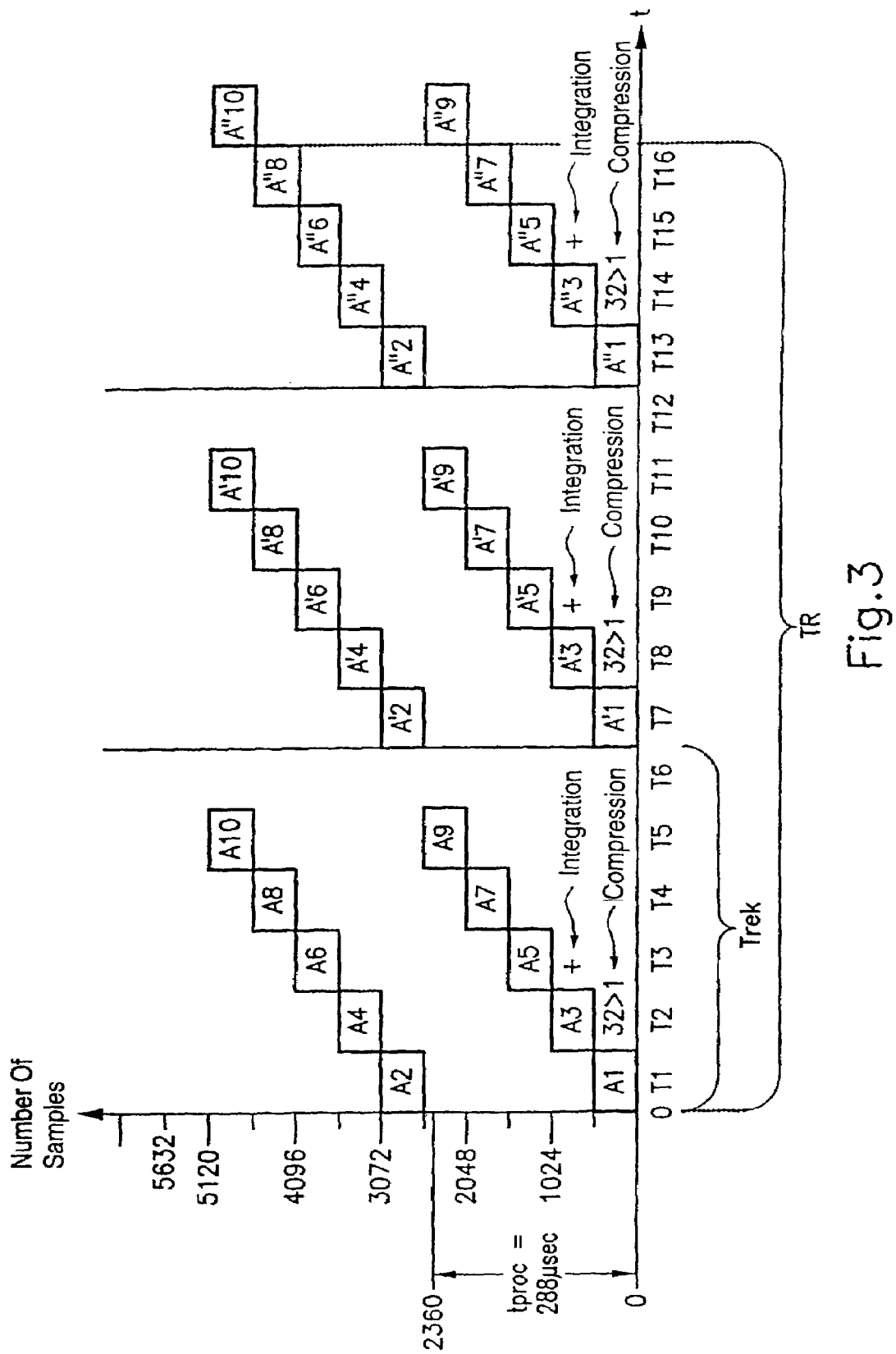
FIG. 3 shows a diagrammatic representation in which the number of samples of the received time slot synchronization code sequences and the time intervals of the samplings are plotted against time t.

According to the example shown in FIG. 3, the period corresponding to one time slot synchronization code sequence is divided into ten time intervals. Each time interval thus corresponds to a period of 256 chips of the time slot synchronization code sequence c(BSX).

According to the invention, only a part of the samples obtained during the detection of the time slot synchronization code sequences c(BSX) is now stored in a memory and used for the correlation with the time slot synchronization code sequence c(BSX) known to the receiver MS. FIG. 3 illustrates the timing pattern of the data reception and storage. Beginning at an arbitrary time t=0, 512 samples (per I/Q branch) are initially stored in a first time interval and thus a first portion A1 of the received time slot synchronization code sequence c(BSX) is recorded. Naturally, the position of this portion within the time slot synchronization code sequence c(BSX) is not initially known. The samples obtained in the subsequent four time intervals are discarded. The samples obtained in the fifth time interval are stored as portion A2 of the time slot synchronization code sequence c(BSX) and the samples obtained in time intervals 6 to 10 are again discarded.

In the next time slot period T2, the samples obtained in the second and the sixth time interval are stored as portions A3 and A4 of the (next) time slot synchronization codes sequence c(BSX) whereas the samples obtained in the remaining time intervals are discarded. As shown in FIG. 3, this pattern continues within the time slot periods T3 to T5, i.e. the samples obtained in the nth and the n+5th time interval are stored in the nth time slot period Tn, n=1, 2, . . . , 5.

After five time slot periods T1 to T5, the entire time slot synchronization code sequence c(BSX) has been completely sampled section by section.

Immediately at the beginning of the reception of the samples of a portion (e.g. A1), a calculation of the correlation of the samples with the time slot synchronization code sequence c(BSX) known in the mobile radio receiver MS is performed. The correlation calculation is concluded within a calculation period tproc. In the example shown in FIG. 3, the calculation period tproc=288 μsec, and is thus shorter than five interval periods. The calculation of a first correlation result with respect to the samples of the first portion A1 is thus already concluded when the samples of the second portion A2 are received. Accordingly, the samples of the first portion A1 can be overwritten by the samples of the second portion A2. This analogously applies to the samples obtained in the further portions A3, A4, . . . , A10.

Since the samples obtained in the previous portion can be overwritten by new samples with each storage and each portion includes a number of 512 samples, a memory size of slightly more than 0.5 k×16 bits is sufficient as the input data memory. The size of the input data memory is thus reduced by a factor of 10 in comparison with the case where all samples of a time slot synchronization code sequence c(BSX) must be stored in this memory.

There is no storage of samples in the time slot period T6. During T6, the correlation calculation with respect to the portion A10 is performed.

In the exemplary method explained with reference to FIG. 3, the correlation of the samples of a single time slot synchronization code sequence c(BSX) is extended over six time slot periods T1 to T6. It is thus only after six time slot periods T1 to T6 that the accuracy (statistics) of the overall correlation corresponds to the accuracy which could have been obtained already in the first time slot period T1 if all samples had been used. As already explained, however, the much smaller memory requirement is advantageous in the method sequence according to the invention.

It is pointed out that it is not absolutely necessary for the invention for tproc to be smaller than the period between the beginning of the first time interval in which the samples of the first portion A1 are detected and the beginning of the next time interval in which the samples of the portion A2 immediately following are detected. If this condition is not met, the samples of the next portion (A2) must be written into another memory area. Overwriting the first memory area which can take place after the calculation time tproc has elapsed, will then be done at a later time, for example by using the samples of the one after the next portion (A3).

The calculation of the correlation results of the individual portions A1, A2, . . . with the time slot synchronization code sequence c(BSX) is performed by using a correlator in a manner known per se. The correlator "compares" the 512 samples of the detected portion obtained with all sequences of the same length of the time slot synchronization code sequence c(BSX), which are in each case displaced cyclically by one data element (chip). To illustrate, the detected portion consisting of the 512 samples obtained is shifted over the time slot synchronization code sequence c(BSX) until a "fitting" sequence with a similar (theoretically identical, if transmission, detection and decoding errors are neglected) sequence of values is found in the time slot synchronization code sequence c(BSX). The position of this correlated value sequence within the known time slot synchronization code sequence c(BSX) determines the time interval between t=0 (i.e. the initially arbitrary starting time of the sampling explained in FIG. 3) and the position in time of the time slots of the received radio signal F occurring at the receiver. The latter corresponds to the starting times (displaced by the signal delay) t1, t2, . . . , tN of time slots S1, S2, . . . , SN according to the representation in FIG. 2b.

Knowledge of this time interval enables the time slot synchronization of the mobile station MS with the base station BSX. This can be illustrated by imagining the synchronization to be taking place in such a manner that a displacement of the arbitrary sampling starting time t=0 by the time interval determined ensures that the new sampling starting time t=0 falls on the beginning of a time slot.

FIG. 3 illustrates that the measuring sequence is repeated after in each case K=6 time slot periods in the example shown here. The period after which the measuring sequence is repeated is called the recursion time Trek. To improve the correlation statistics, the correlation results obtained with respect to portions An, A'n, A"n, n=1, 2, . . . , 10, corresponding to one another can be integrated or averaged, respectively, over a number of recursions of the measuring sequence. The time slot position is then determined using the integrated (averaged) correlation results, i.e. after 2 Trek at the earliest.

Another preferred possibility consists in compressing the correlation result data obtained on the basis of the individual portions A1, A2, . . . before further processing (particularly the aforementioned integration/averaging). This makes it possible to considerably reduce the data volume of the individual correlation results (for example by a factor of 32).

It is pointed out that the frame period TR (N=16 time slots long in this case) does not need to be commensurable with the recursion period Trek (K=6 time slots long in this case).

Figure 4:
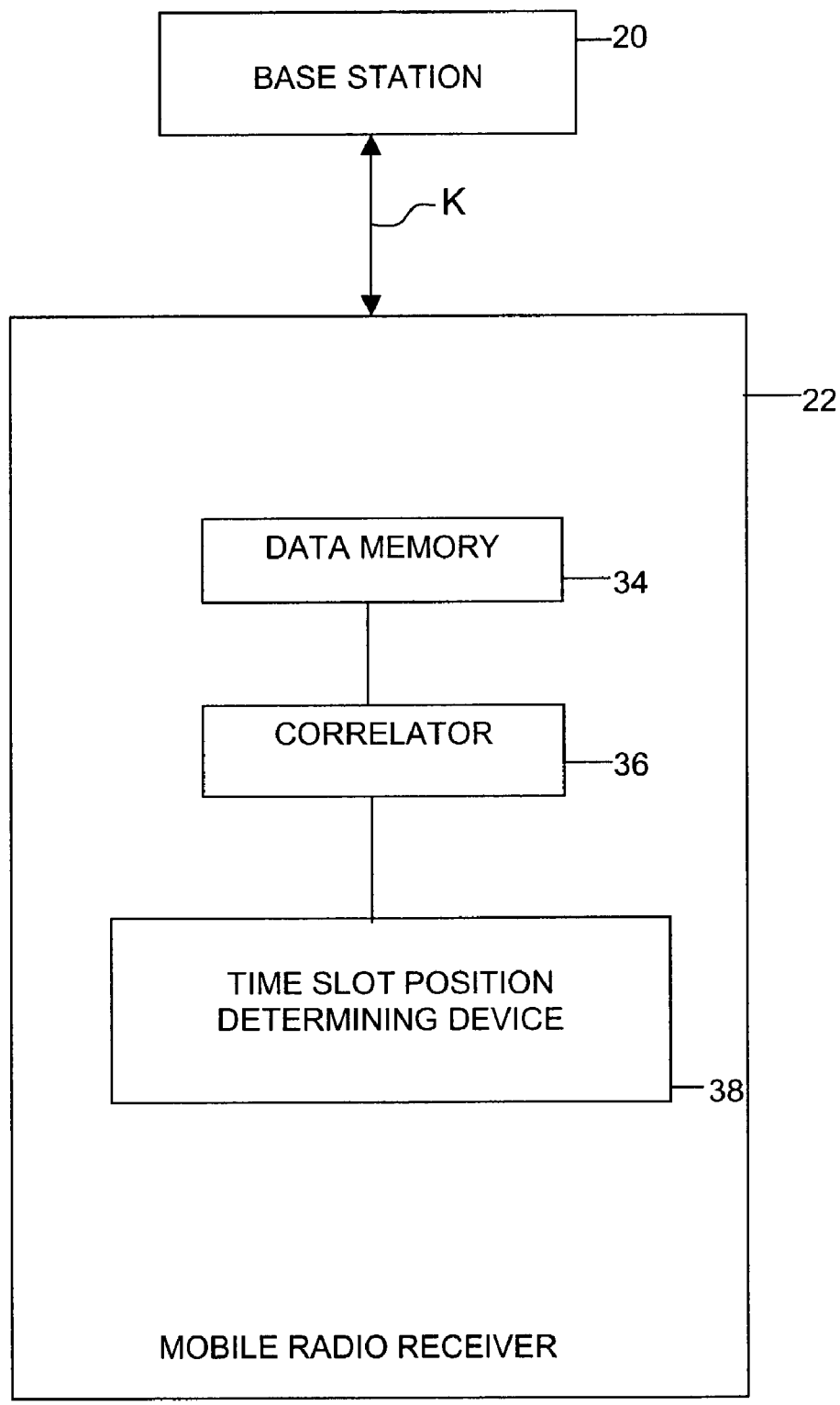
FIG. 4 shows a mobile radio communication system with a device for synchronizing a mobile radio receiver with a time slot structure of a radio signal obtained from a base station.

FIG. 4 shows a cellular mobile radio communication system with a device 30 for synchronizing a mobile radio receiver 22 with a time slot structure of a radio signal obtained from a base station 20. The base station 20 sends out a time slot synchronization code sequence in each one of a plurality of time slots of a radio signal. The time slot synchronization code sequence includes a predetermined sequence of data elements. The time slot synchronization code sequence is known in the mobile radio receiver 22. The device 30 includes a data memory 34 for storing detected portions of the time slot synchronization code sequence. The device 30 includes a correlator 36 for obtaining correlation results by correlating individual ones of the detected portions of the time slot synchronization code sequence, which are stored in the data memory 34, with the known time slot synchronization code sequence. The device 30 also includes a time slot position determining device 38 for using the correlation results to determine a position of a time slot structure in time of the radio signal that is obtained from the base station 20. The data memory 34 has a memory size that essentially corresponds to a data volume contained in one of the detected portions of the time slot synchronization code sequence.

We claim:

1. A method for synchronizing a mobile radio receiver with a time slot structure of a radio signal obtained from a base station, the method which comprises:

in each of a plurality of time slots, using the base station to send out a time slot synchronization code sequence that is known in the mobile radio receiver, the time slot synchronization code sequence including a predetermined sequence of data elements; and in the mobile radio receiver:

dividing the period corresponding to the one time slot synchronization code sequence into two or more time intervals, each time interval containing a portion of the time slot synchronization code sequence;

during a first time slot period, detecting a first portion of the time slot synchronization code sequence, obtaining a first result by correlating the first portion of the time slot synchronization code sequence that is detected with a known time slot synchronization code sequence, during a second time slot period, detecting a second portion of the time slot synchronization code sequence, obtaining a second result by correlating the second portion of the time slot synchronization code sequence that is detected with the known time slot synchronization code sequence, and determining a time slot position in time from the first result and the second result.

2. The method according to claim 1, which comprises:
during the first time slot period and during the second time slot period, detecting a plurality of portions of the time slot synchronization code sequence, respectively, and correlating the plurality of the portions of the time slot synchronization code sequence with the known time slot synchronization code sequence.

3. The method according to claim 1, which comprises:
overwriting a memory content of a given data memory to store the portion of the time slot synchronization code sequence of the second time slot period.

4. The method according to claim 1, which comprises:
defining the time slot synchronization code sequence as a first time slot synchronization code sequence;
after each one of a plurality of recursion periods of K time slot periods:
detecting a first portion of a second time slot synchronization code sequence that is sent out by the base station, the second time slot synchronization code sequence being identical to the first time slot synchronization code sequence, obtaining a first additional result by correlating the first portion of the second time slot synchronization code sequence with the known time slot synchronization code sequence, detecting a second portion of the second time slot synchronization code sequence, and obtaining a second additional result by correlating the second portion of the second time slot synchronization code sequence with the known time slot synchronization code sequence;

obtaining a first integration result by integrating each first additional result obtained over the plurality of the recursion periods;

obtaining a second integration result by integrating each second additional result obtained over the plurality of the recursion periods; and using the first integration result and the second integration result to perform the step of determining the time slot position in time.

5. The method according to claim 1, which comprises:

compressing the first result and the second result to obtain a compressed first result and a compressed second result; and performing the step of determining the time slot position in time by using the compressed first result and the compressed second result.

6. A device for synchronizing a mobile radio receiver with a base station sending out a time slot synchronization code sequence in each one of a plurality of time slots of a radio signal, the time slot synchronization code sequence including a predetermined sequence of data elements, the time slot synchronization code sequence defining a known time slot synchronization code sequence that is known in the mobile radio receiver, the device being configured in the mobile radio receiver and comprising:

a data memory for storing one or multiple detected portions of the time slot synchronization code sequence;

a correlator for obtaining correlation results by correlating individual ones of the detected portions of the time slot synchronization code sequence, which are stored in said data memory, with the known time slot synchronization code sequence; and a time slot position determining device for using the correlation results to determine a position of a time slot structure in time of the radio signal obtained from the base station.

7. The device according to claim 6, wherein said data memory has a memory size that essentially corresponds to a data volume contained in one of the detected portions of the time slot synchronization code sequence.

* * * * *